United States Patent [19]

Kalmus

[11] 4,218,977
[45] Aug. 26, 1980

[54] DOPPLER DISTANCE MEASURING SYSTEM

[75] Inventor: Henry P. Kalmus, Washington, D.C.

[73] Assignee: The United States of America as represented by the Secretary of the Army, Washington, D.C.

[21] Appl. No.: 814,354

[22] Filed: May 19, 1959

[51] Int. Cl.³ .................. F42C 13/04; G01S 13/08
[52] U.S. Cl. .................. 102/214; 343/7 PF; 343/12 R
[58] Field of Search .............. 343/7, 8, 9, 12, 5, 343/13, 17.1, 12 R, 7 PF; 102/70.2 P, 214

[56] References Cited

U.S. PATENT DOCUMENTS 4,118,702  10/1978  Rabinow .................. 343/7 PF

*Primary Examiner*—T. H. Tubbesing
*Attorney, Agent, or Firm*—Nathan Edelberg; Robert P. Gibson; Saul Elbaum

EXEMPLARY CLAIM

3. A missile fuzing system adapted to detonate the missile at a predetermined altitude regardless of the reflection coefficient of or the velocity of approach to the earth, said system comprising in combination: an antenna adapted to radiate radio frequency energy toward a target and receive reflected energy therefrom, an oscillating detector connected to said antenna, said oscillating detector mixing the transmitted and reflected energy to produce a doppler signal at its output representative of the relative velocity between the missile and the earth, first envelope detection means connected to the output of said oscillating detector for producing a negative signal corresponding to the envelope of said doppler signal, a network connected to the output of said oscillating detector for producing an output signal having a peak amplitude which is proportional to the product of a first and a second quantity, said first quantity being proportional to the peak amplitude of said doppler signal and said second quantity being proportional to doppler frequency, second envelope detection means connected to said network for producing a positive signal corresponding to the envelope of said output signal, a differentiating circuit comprising a first resistor having one end connected to circuit ground, a capacitor having one end connected to the other end of said first resistor and the other end of said capacitor connected to the output of said first envelope detection means so that a voltage is developed across said first resistor corresponding to the differentiation of the negative signal produced by said first envelope detection means, a variable resistor having one end connected to the point intermediate said first resistor and said capacitor and the other end of said variable resistor connected to the output of said second envelope detection means so that a second voltage is developed across said first resistor corresponding to the positive signal produced by said second envelope detection means, the amplitude of said second voltage being dependent on the adjustment of said variable resistor, an amplifier to which the junction point of said first resistor, said capacitor and said variable resistor is connected to apply the sum of said first and said second voltages across said resistor to said amplifier, a firing circuit to which the output of said amplifier is set, said firing circuit producing a firing pulse in response to the zero cross over of said sum of said first and second voltages, the altitude at which said sum appearing across said first resistor becomes zero being determined by the adjustment of said variable resistor, and a detonator connected to the output of said firing circuits for initiating detonation upon receipt of said firing pulse.

3 Claims, 3 Drawing Figures

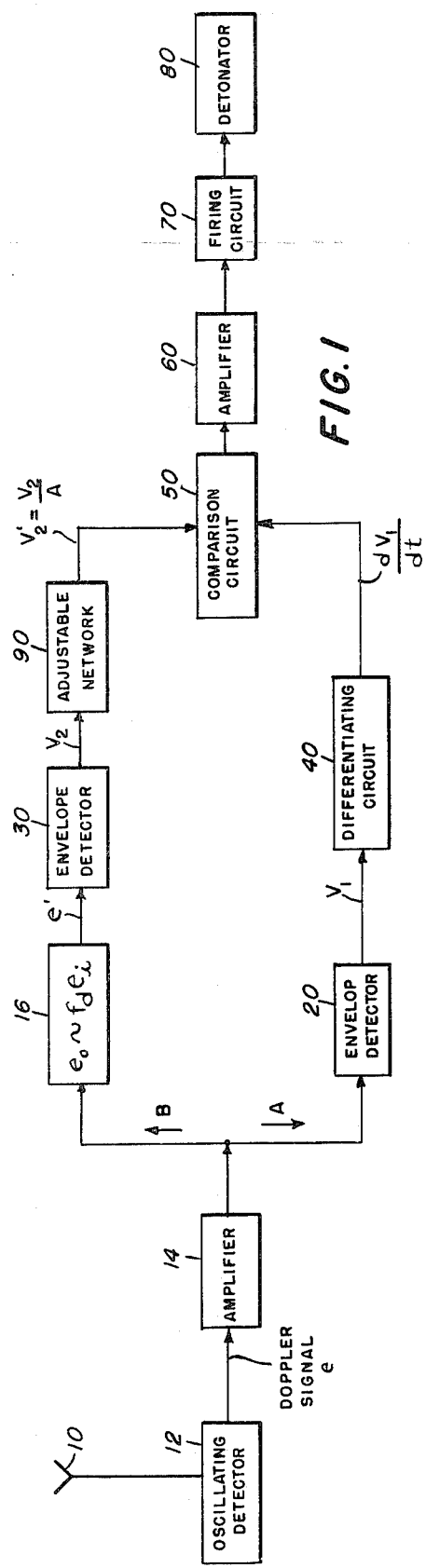
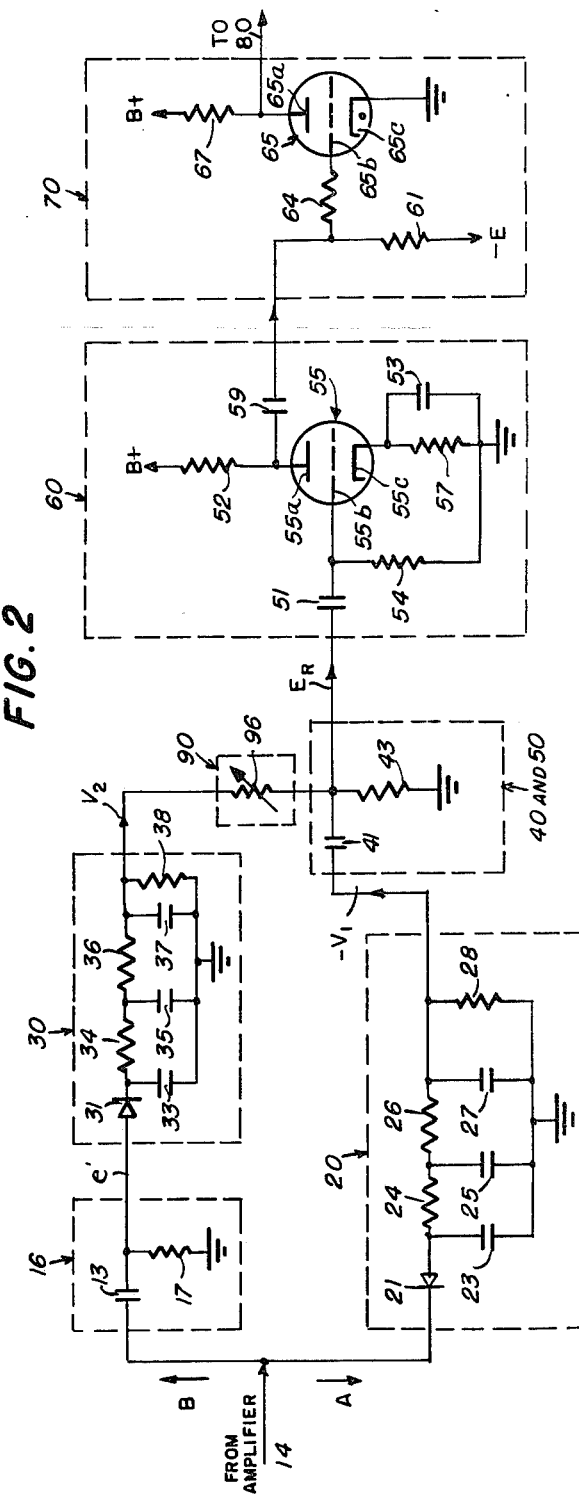
FIG. 1
FIG. 2

DOPPLER DISTANCE MEASURING SYSTEM

The invention described herein may be manufactured and used by or for the Government for governmental purposes without the payment to me of any royalty thereon.

This invention generally relates to doppler distance measuring systems, and more particularly to a doppler distance measuring system capable of reliably indicating a predetermined altitude, regardless of the reflection coefficient of the target or the velocity of approach thereto.

Prior art doppler distance measuring systems rely on the knowledge or constancy of the target reflection coefficient and the velocity of approach in order to make use of a doppler signal to provide an indication of altitude. Where the reflection coefficient and velocity of approach are variable, these prior art systems are unable to provide a reliable indication of altitude.

It is the chief object of this invention, therefore, to provide a doppler distance measuring system which will reliably indicate a predetermined altitude regardless of the reflection coefficient of the target or the velocity of approach thereto.

Another object is to incorporate the doppler distance measuring system in accordance with the above-mentioned object for use as a fuzing system in ordnance missiles.

The present invention is based on the discovery that if a signal corresponding to the differentiated envelope of the doppler signal is compared with a signal corresponding to the envelope of the doppler signal obtained after the doppler signal has been passed through a network adapted to introduce a linear velocity term, a determination of when these two signals become equal for a given adjustment of the constant proportionality factor of at least one of the two signals permits a predetermined altitude to be recognized which is independent of the reflection coefficient of the target or the velocity of approach thereto, the predetermined altitude being determined by the adjustment of the constant proportionality factor. In a typical embodiment of the invention, means are provided for producing and comparing the differentiated envelope of the doppler signal with the envelope of the doppler signal after it has been passed through first and second networks, the first network having an output voltage proportional to frequency and the second network introducing an adjustable constant proportionality factor. These two signals are fed to a comparison circuit which provides an indication for the condition where the two signals become equal, the altitude at which this equality occurs being determined by the adjustment of the adjustable constant proportionality factor.

The specific nature of the invention, as well as other objects, uses, and advantages thereof, will clearly appear from the following description and from the accompanying drawing, in which:

FIG. 1 is a block diagram of a preferred embodiment of a doppler fuzing system for use in ordnance missiles, in accordance with the invention.

FIG. 2 is a circuit diagram of preferred forms of the pertinent elements of the embodiment of FIG. 1.

Figure 3:
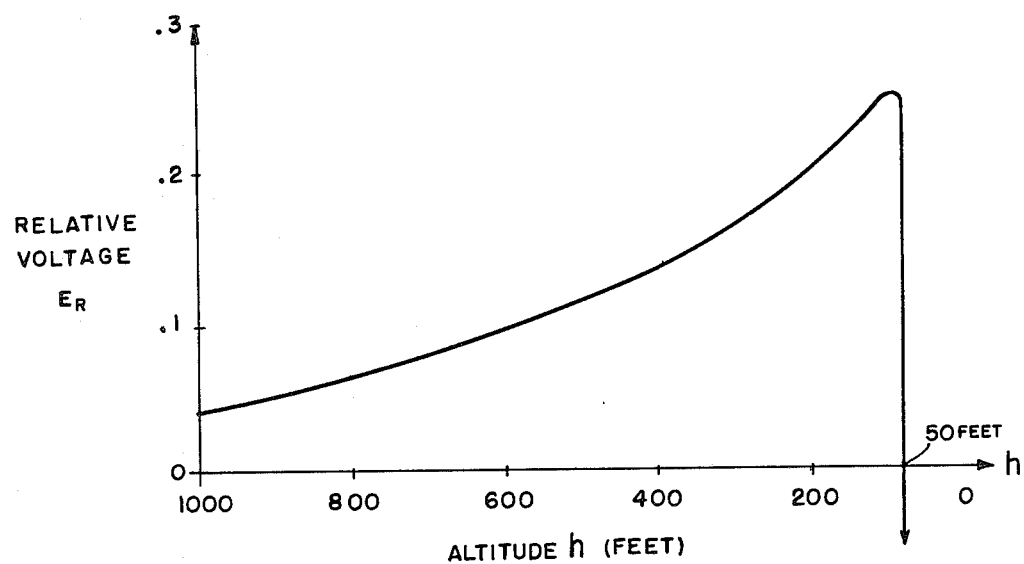
FIG. 3 is a graph showing the difference between the $V_2$ and $-dV_1/dt$ voltages developed across the resistor 43 in FIG. 2.

It can be mathematically and experimentally shown that the doppler signal e may be expressed as a function of the reflecting coefficient r and the altitude h as follows:

$$e = K(r/h) \sin \omega_d t \qquad (1)$$

where $\omega_d$ equals $2\pi f_d$, $f_d$ being the doppler frequency, and where K is a constant proportionality factor. The amplitude of the envelope $V_1$ of the doppler signal e may then be represented as:

$$V_1 = K(r/h) \qquad (2)$$

If equation (2) representing the amplitude $V_1$ of the doppler signal envelope is differentiated with respect to time, the equation obtained is as follows:

$$dV_1/dt = -K_1(r/h^2)(dh/dt) = K_1(r/h^2)v \qquad (3)$$

where v is velocity and the constant K has become $K_1$ to allow for the change in amplitude resulting from the differentiating process. The change in sign is made from the assumption that the altitude h is decreasing, making dh/dt or v negative.

If the doppler signal e represented by equation (1) is passed through a network producing an output signal proportional to the doppler frequency $f_d$, the resulting signal $e^1$ obtained is:

$$e^1 = K^1 f_d e = K^1 K f_d (r/h) \cos \omega_d t \qquad (4)$$

where $K^1$ is a constant proportionality factor determined by the network. If the envelope $V_2$ of $e^1$ is then obtained, the resulting equation for $V_2$ is as follows:

$$V_2 = K^1{}_2(r/h)f_d \qquad (5)$$

and since, as is well known, the velocity v is proportional to the doppler frequency $f_d$ ($K_2 v = K^1{}_2 f_d$), equation (5) becomes:

$$V_2 = K_2(r/h)v \qquad (6)$$

where $K_2$ is a constant proportionality factor.

Now, if the constant proportionality factor of $V_2$ in equation (6) is made adjustable by the introduction of an adjustable constant proportionality factor 1/A as follows:

$$V^1{}_2 = (1/A)V_2 = (1/A)K_2(r/h)v \qquad (7)$$

and letting $$\Delta V = V_2{}^1 - (dV_1/dt) = (1/A)K_2(r/h)v - K_1(r/h^2)v \qquad (8)$$

and then setting $\Delta V = 0$ gives $$(1/A)K_2 h - K_1 = 0$$

$$h = A(K_1/K_2) \qquad (9)$$

From equation (9) it can be seen that the altitude h at which $\Delta V$ becomes zero is completely independent of the velocity of approach v or the reflection coefficient r. Since the values of $K_1$ and $K_2$ are constant and the proportionality factor A is adjustable, it is evident that the predetermined altitude h at which $\Delta V$ becomes zero can be adjusted to have a desired value by adjusting the value of A.

FIG. 1 is a block diagram of a preferred embodiment of a doppler fuzing system based on equations (6) and (7) whereby fuze functioning is obtained at a predetermined altitude, regardless of the reflection of the target or the velocity of approach.

In FIG. 1, an antenna 10 which radiates and receives energy reflected from a target (not shown) is connected to a conventional oscillating detector in accordance with well known practice. The doppler signal e obtained at the output of the oscillating detector 12 is fed to an amplifier 14 having a bandwidth chosen for the range of doppler frequencies to which response is desired.

The output of the amplifier 14 is fed to two paths A and B. In path A the amplified doppler signal e represented by equation (1) is first fed to an envelope detector 20 which produces an output signal $V_1$ having an amplitude which varies with the amplitude of the doppler envelope. This signal $V_1$ is represented by equation (2). The signal $V_1$ is then fed to a differentiating circuit 40 which produces an output signal having an amplitude which varies with the time rate of change of $V_1$ or $dV_1/dt$, and is represented by equation (3).

In path B the amplified doppler signal e is first fed to a network 16 which produces a signal output $e^1$ represented by equation (4); that is, the output signal $e_o$ of the network 16 is proportional to $f_d e_i$, where $e_i$ is the input signal to the network 16 and $f_d$ is the doppler frequency. Since the doppler frequency $f_d$ is proportional to the velocity v, the network 16 thus effectively introduces a linear velocity term. The voltage $e^1$ from the network 16 is fed to an envelope detector 30 which produces an output signal $V_2$ represented by equation (6). The output signal $V_2$ is then fed to an adjustable network 90 which introduces an adjustable constant proportionality factor 1/A to produce a $V^1{}_2$ signal at its output represented by equation (7).

The signals $V^1{}_2$ and $dV_1/dt$ from the envelope detector 30 and the differentiating circuit 40, respectively, are fed to the two inputs of a comparison circuit 50 which is adapted to produce an indication when its two input signals are equal, that is, when $\Delta V = V^1{}_2 - (dV_1/dt)$ (equation 8) becomes zero. For this condition, the comparison circuit 50 produces an indication which when amplified by an amplifier 60 initiates a firing circuit 70. The initiation of the firing circuit 70 is adapted to activate a conventional detonator 80 which detonates the missile.

In FIG. 2 are shown specific preferred forms of the envelope detectors 20 and 30, the network 16, the differentiating circuit 40, the comparison circuit 50, the amplifier 60 and the firing circuit 70, shown in block form in FIG. 1. In path B, the network 16 comprises a capacitor 13 and a resistor 17, the reactance of the capacitor 13 being chosen to be considerably greater than the value of the resistor 17 so that the output voltage of the network 16 will have an amplitude substantially proportional to the frequency of the input signal over the range of doppler frequencies being considered.

The envelope detectors 20 and 30 of FIG. 2 are substantially the same except that the diodes 21 and 31 in the envelope detectors 20 and 30, respectively, are oppositely poled. Following each diode is a low pass filter comprised of capacitors 23, 25, 27 and resistors 24, 26, 28 for the envelope detector 20, and capacitors 33, 35, 37 and resistors 34, 36, 38 for the envelope detector 30. The low pass filters are designed in accordance with well known practice so that the outputs $V_2$ and $-V_1$ of the detectors 20 and 30, respectively, correspond to the envelopes of the input signals applied thereto. The negative sign has been introduced into the voltage $-V_1$ because of the opposite poling of the diodes 21 and 31.

The differentiating circuit 40 of FIG. 1 is represented by the R C combination of the capacitor 41 and the resistor 43, the capacitor 41 being chosen to have a sufficiently large reactance at the doppler frequencies so that a first voltage, corresponding to the rate of change of the output voltage $-V_1$ from the detector 20, or $dV_1/dt$, is developed across the resistor 43. The variable resistor 96 serves as the adjustable network 90, and by acting as a voltage divider with the resistor 43 develops a second voltage across the resistor 43 whose amplitude may be adjusted.

It will be understood that the resultant voltage across the resistor 43 is the voltage $\Delta V$ expressed by equation (8). The resistor 43, therefore, effectively serves as the comparison circuit 50. It will also be understood that by adjusting the variable resistance 96, the value of the constant proportionality factor A in equation (9) is adjusted, thereby permitting the predetermined altitude h at which the voltage across the resistor 43 becomes zero to be chosen as desired for any particular application.

From a knowledge of the circuit constants and the characteristics of the system which determine the values of A, $K_1$ and $K_2$ in equation (9), those skilled in the art will readily be able to adjust the variable resistor 96 to cause the voltage across the resistor 43 to become zero at any desired predetermined altitude.

In FIG. 3, the relative voltage $E_R$ across the resistor 43 is plotted against the altitude h for a system designed according to FIG. 2 with the variable resistor 96 adjusted to cause the voltage $E_R$ to become zero at an altitude h of 50 feet. It can be seen that the voltage $E_R$ goes from a relatively high positive voltage to zero at 50 feet altitude and then goes negative, all within a very short altitude range of about 10 feet. Such a high slope zero crossover has been found to be characteristic of the $E_R$ voltage, thereby permitting a predetermined altitude to be recognized with high accuracy.

To recognize the point at which $E_R$ becomes zero corresponding to a predetermined altitude set by the adjustment of the variable resistor 96, the voltage $E_R$ is first fed to an amplifier 60 comprising a vacuum tube triode 55 having a plate 55a, a grid 55b, and a cathode 55c. A coupling capacitor 51 couples the $E_R$ voltage to the grid 55b, resistors 52 and 54 are conventional plate and grid resistors, respectively, and a d-c voltage source B+ supplies d-c power. The parallel combination of the resistor 57 and the capacitor 53 serve to provide self bias and the capacitor 59 serves to couple the amplified $E_R$ signal to the firing circuit 70. It will be understood that the output voltage of the amplifier 60 will go from a relatively high negative voltage to a relatively high positive voltage at crossover, because of the 180° phase shift produced by the amplifier 60.

The firing circuit 70 to which the amplified $E_R$ voltage is fed comprises a gas thyratron 65 having a plate 65a, a grid 65b, and a cathode 65c. The plate 65a is connected to B+ through a plate resistor 67 and the resistors 64 and 61 are conventional grid resistors found in thyratron circuits, the output of the amplifier 60 being applied to a point intermediate thereof. The voltage $-E$ provides a cut-off bias to the thyratron grid 65b to prevent breakdown of the thyratron 65 until the voltage applied to the grid 65b reaches a predetermined positive value. The gain provided by the amplifier 60 coupled with the high slope zero crossover is adjusted in cooperation with the negative cut-off bias —E so that the thyratron breaks down very shortly after the zero crossover point is reached, thereby producing a firing pulse at the plate 65a at substantially the same altitude corresponding to the zero crossover point. This firing pulse may then be fed to a detonator 80 to initiate missile detonation. Alternatively, the firing pulse may be used to initiate any other desired function.

It is to be understood that the invention is not limited to the particular embodiments shown in FIGS. 1 and 2. This invention is intended to include any means whereby a first signal is produced corresponding to the differentiated envelope $dV_1/dt$ of the doppler signal e, whereby a second signal is produced corresponding to the envelope obtained after the doppler signal has been passed through a network adapted to introduce a linear velocity term, and whereby these two signals are compared to determine when they become equal for a given adjustment of the constant proportionality factor of at least one of the two signals, thereby permitting a predetermined altitude to be recognized which is independent of the reflection coefficient of the target or the velocity of approach thereto.

It is also to be understood that this invention may be applied to other distance measuring systems as well as the fuzing system shown in FIGS. 1 and 2. It will be apparent, therefore, that the embodiments shown are only exemplary and that various modifications can be made in construction and arrangement within the scope of the invention as defined in the appended claims.

I claim as my invention:

1. A doppler distance measuring system for use in a body moving relative to the earth and capable of reliably indicating a predetermined altitude regardless of the reflection coefficient or the velocity of approach to the earth, said system comprising in combination: means for transmitting radiofrequency energy towards the earth, receiving reflected energy therefrom, and mixing the transmitted and received energy to produce a doppler signal representative of the relative motion between said body and the earth, means for producing a first signal corresponding to the differentiated envelope of said doppler signal, means responsive to said doppler signal for producing an output signal having a magnitude proportional to the doppler frequency, means for producing a second signal corresponding to the envelope of said output signal, means for adjusting the amplitude of at least one of said first and said second signals, and means for producing an indication corresponding to the condition when said first and said second signals becomes equal, said indication occurring at an altitude determined by said adjusting means.

2. A doppler distance measuring system for use in a body moving relative to the earth and capable of reliably indicating a predetermined altitude regardless of the reflection coefficient of or the velocity of approach to the earth, said system comprising in combination: means for transmitting radio frequency energy towards the earth, receiving reflected energy therefrom, and mixing the transmitted and received energy to produce a doppler signal representative of the relative velocity between said body and the earth; first and second paths to which the doppler signal is fed; said first path comprising first envelope detection means for producing a signal corresponding to the envelope of said doppler signal, and differentiating means connected to the output of said first envelope detection means for producing a first signal corresponding to the rate of change of the envelope of said doppler signal; said second path comprising signal responsive means for producing an output signal having a peak amplitude which is proportional to the product of a first and a second quantity, said first quantity being proportional to the peak amplitude of said doppler signal and said second quantity being proportional to doppler frequency, second envelope detection means connected to the output of said signal responsive means for producing a second signal corresponding to the envelope of said output signal, and an adjustable network connected to said second envelope detection means for adjusting the amplitude of second signal; comparison means to which the outputs of said adjustable network and said differentiating means are fed, said comparison means producing an indication when said first and said second signals become substantially equal, the preselected setting of said adjustable network determining the altitude at which equality is obtained.

3. A missile fuzing system adapted to detonate the missile at a predetermined altitude regardless of the reflection coefficient of or the velocity of approach to the earth, said system comprising in combination: an antenna adapted to radiate radio frequency energy toward a target and receive reflected energy therefrom, an oscillating detector connected to said antenna, said oscillating detector mixing the transmitted and reflected energy to produce a doppler signal at its output representative of the relative velocity between the missile and the earth, first envelope detection means connected to the output of said oscillating detector for producing a negative signal corresponding to the envelope of said doppler signal, a network connected to the output of said oscillating detector for producing an output signal having a peak amplitude which is proportional to the product of a first and a second quantity, said first quantity being proportional to the peak amplitude of said doppler signal and said second quantity being proportional to doppler frequency, second envelope detection means connected to said network for producing a positive signal corresponding to the envelope of said output signal, a differentiating circuit comprising a first resistor having one end connected to circuit ground, a capacitor having one end connected to the other end of said first resistor and the other end of said capacitor connected to the output of said first envelope detection means so that a voltage is developed across said first resistor corresponding to the differentiation of the negative signal produced by said first envelope detection means, a variable resistor having one end connected to the point intermediate said first resistor and said capacitor and the other end of said variable resistor connected to the output of said second envelope detection means so that a second voltage is developed across said first resistor corresponding to the positive signal produced by said second envelope detection means, the amplitude of said second voltage being dependent on the adjustment of said variable resistor, an amplifier to which the junction point of said first resistor, said capacitor and said variable resistor is connected to apply the sum of said first and said second voltages across said resistor to said amplifier, a firing circuit to which the output of said amplifier is set, said firing circuit producing a firing pulse in response to the zero cross over of said sum of said first and second voltages, the altitude at which said sum appearing across said first resistor becomes zero being determined by the adjustment of said variable resistor, and a detonator connected to the output of said firing circuits for initiating detonation upon receipt of said firing pulse.

* * * * *